Nov. 19, 1940.    H. F. KURTZ ET AL    2,221,920
PROJECTOR
Filed Feb. 16, 1939    2 Sheets-Sheet 1

HENRY F. KURTZ
BERNARD J. WOLFE
INVENTORS

BY
ATTORNEYS

Nov. 19, 1940.                H. F. KURTZ ET AL                2,221,920
                                  PROJECTOR
                             Filed Feb. 16, 1939              2 Sheets-Sheet 2
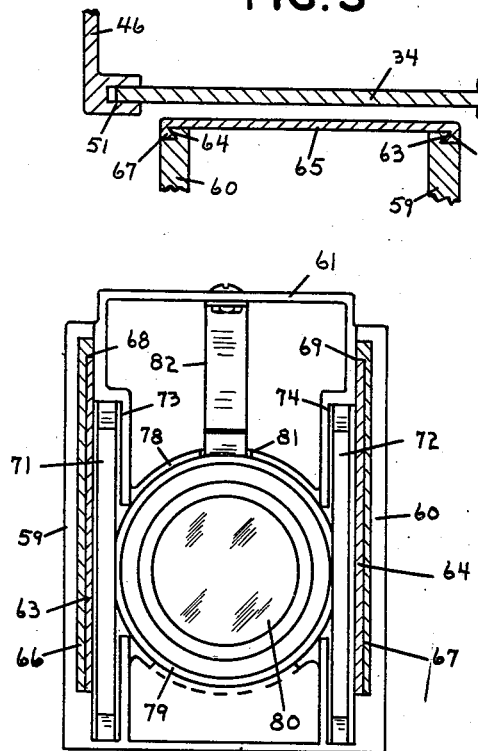
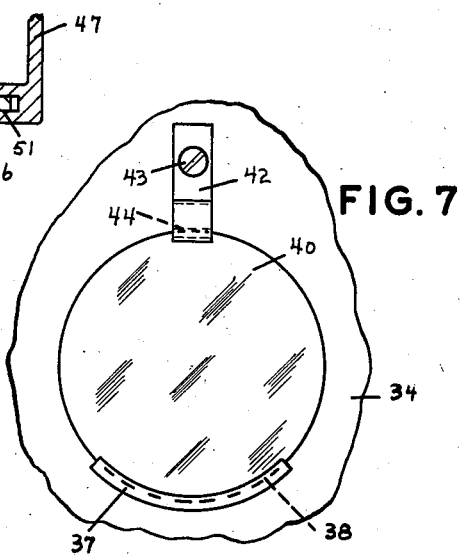
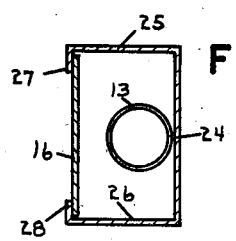
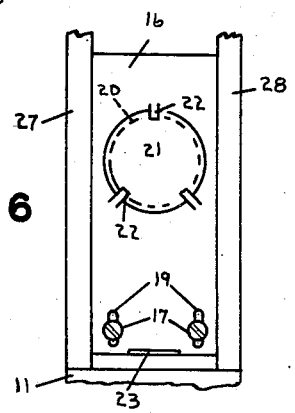
HENRY F. KURTZ
BERNARD J. WOLFE
INVENTORS Patented Nov. 19, 1940

2,221,920

UNITED STATES PATENT OFFICE 2,221,920

PROJECTOR

Henry F. Kurtz, Rochester, and Bernard J. Wolfe, Greece, N. Y., assignors to Bausch & Lomb Optical Company, Rochester, N. Y., a corporation of New York Application February 16, 1939, Serial No. 256,744

4 Claims. (Cl. 88—26)

The present invention relates to optical apparatus and more particularly to an optical projector for projecting transparencies such as slides.

One of the objects of the present invention is to provide a projector which is rugged and efficient in operation yet simple and inexpensive to manufacture. Another object is to provide a projector construction requiring a minimum of labor or machine work. A further object is to provide a projector composed chiefly of preformed interfitting parts. These and other objects and advantages reside in certain novel features of construction, arrangement and combination of parts as will hereinafter be more fully set forth and pointed out in the appended claims.

Referring to the drawings:

Fig. 3 is a section taken on line 3—3 of Fig. 2.

Fig. 4 is a section taken on line 4—4 of Fig. 2.

Fig. 5 is a section taken on line 5—5 of Fig. 2.

Fig. 6 is a fragmentary rear elevation of the reflector mount.

Fig. 7 is a fragmentary rear elevation of the condenser mount.

Figure 1:
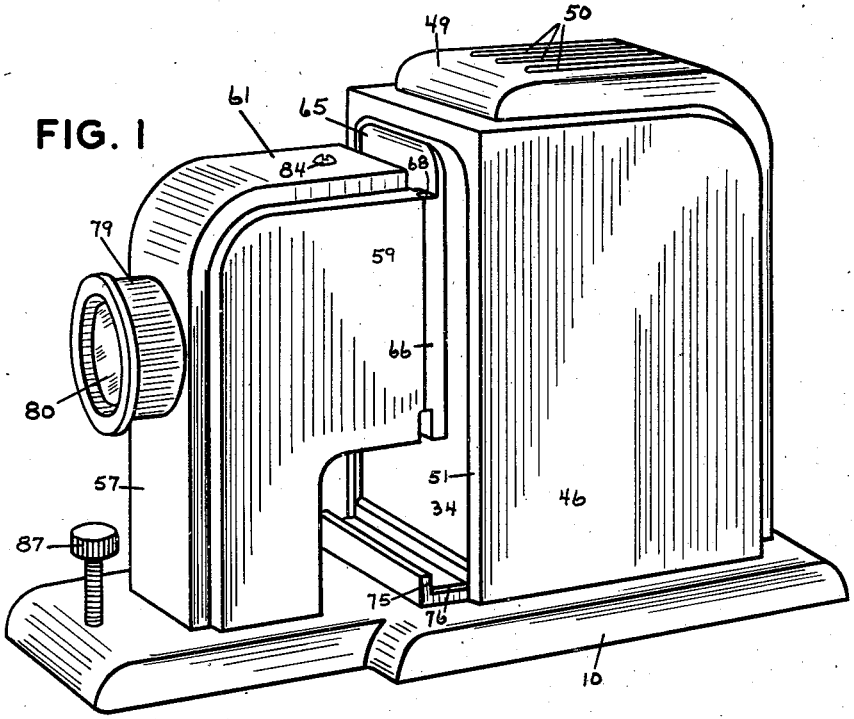
Fig. 1 is a perspective view of a projector embodying our invention.
Figure 2:
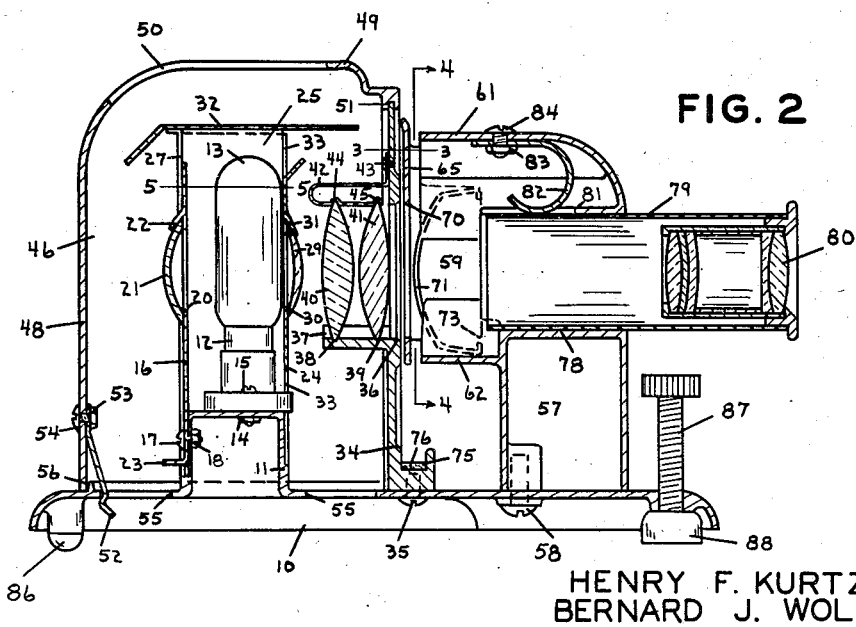
Fig. 2 is a vertical section thereof.

In the embodiment of our invention illustrated in the drawings, 10 designates the base of the projector which is suitably formed with an integral support 11 as, for example, by die casting. A lamp socket 12 carrying a lamp 13 is suitably secured on the support 11 by a nut 14 and bolt 15, for example. A plate 16 is secured to the support 11 by bolts 17 and nuts 18 which pass through oversized holes 19 in the plate 16. The plate 16 is formed with an aperture 20 behind which a concave reflector 21 is secured by fingers 22 struck up from the plate 16. This plate 16 is adjusted until the reflector 21 is properly located behind the lamp 13 and is then locked in adjusted position by the nuts 18 and bolts 17. A projection 23 at the bottom of the plate 16 permits easy adjustment of the plate.

A light shield having a front wall 24 and side walls 25 and 26 surrounds the lamp 13 and frictionally engages the support 11. Flanges 27 and 28 on the walls 25 and 26, respectively, extend inwardly behind the plate 16. A lens 29 formed preferably from heat arresting or heat absorbing glass is secured over an aperture 30 in the front wall 24 of the shield opposite the reflector 21 by fingers 31 struck up from the wall 24. The top of the shield is closed by a cover 32 suitably secured on the walls 25 and 26 as, for example, by welding, and suitable openings 33 are provided in the walls of the shield to permit the passage of a ventilating current of air through the shield around the lamp.

A thin vertical wall or plate 34 is secured to the base 10 in front of the shield by one or more screws or bolts 35. This plate 34 has an aperture 36 in alignment with the lens 29. A shelf 37, formed integrally with the plate 34, extends rearwardly from beneath the aperture 36 and is provided with two parallel grooves 38 and 39 for receiving the bottom edges of the condensing lenses 40 and 41, respectively. A spring 42 secured to the wall 34 above the aperture 36 by a screw 43 bears against the top edges of the lenses 40 and 41 and presses them into the grooves 38 and 39. Two bent portions 44 and 45 in the spring 42 insure proper spacing of the lenses 40 and 41.

The lamp housing consists of two side walls 46 and 47, a rear wall 48 and a top 49, the latter having a plurality of ventilating openings 50. The front of the housing is open and the side walls 46 and 47 and top 48 are provided with a continuous inwardly facing guide or slide groove 51 which slidably engages the plate 34. The bottom of the housing is also open and is held against the top of the base 10 by a resilient latch 52 secured to the rear wall 48 by a nut 53 and bolt 54, for example. This latch 52 engages the edge of one of a suitable number of ventilating holes 55 formed in the base 10. A low baffle wall 56 projects upwardly from the base 10 just inside the walls 46, 47 and 48 of the lamp housing and prevents the escape of stray light.

A hollow support 57 is suitably attached on the base 10 in front of the upright wall 34 by screws or bolts 58. The side walls 59 and 60 of this support project rearwardly beyond the top 61 and bottom 62 by an amount equal to the thickness of a slide and the ends of these walls 59 and 60 are provided with outwardly facing grooves 63 and 64, respectively. An aperture plate 65 having projections 66 and 67 engaging in the grooves 63 and 64, respectively, covers the open rear end of the support 57. The projections 66 and 67 terminate at shoulders 68 and 69 which rest on top of the walls 59 and 60, respectively, and locate the aperture plate 65 so that its aperture 70 is in alignment with the aperture 36 in the plate 34.

Two spring shoes 71 and 72 are located in recesses 73 and 74, respectively, adjacent the walls 59 and 60, respectively. These shoes engage a slide in the slot between the rear or open end of the support 57 and the aperture plate 65 and press the slide into engagement with the aperture plate.

Directly beneath the slot for the slides, the upright wall 34 is shaped to form a trough 75 in which a cushion 76 of rubber or the like is fastened. The aperture 70 in the aperture plate 65 is located above this trough 75 by such an amount that the slide in projecting position at the aperture rests on the top of a slide in the trough 75. The side walls 59 and 60 of the support 57 are cut away at 77 to permit removal of a slide in the trough 75. Upon removal of the slide from the trough 75, the projected slide drops through the slot into the trough 75 and forms a support for the succeeding slide.

Between the recesses 73 and 74, the support 57 has a cylindrical bore 78 for slidably receiving a sleeve 79 carrying an objective lens 80. The top of this bore 78 is cut away at 81 and a spring 82, secured to the top wall 61 by a nut 83 and bolt 84, extends through this cut away portion 81 and frictionally engages the sleeve 79.

To provide for raising and lowering the projector, the base 10 is provided with feet 86 at its rear end and a screw 87 is threaded through the front end of the base 10 and carries a supporting foot 88. Turning this screw 87 raises or lowers the front end of the projector to direct the image up or down to the projection surface.

From the foregoing, it will be apparent that we are able to attain the objects of our invention and provide a slide projector which is rugged and efficient yet inexpensive to manufacture. Various modifications can, of course, be made without departing from the spirit of our invention or the scope of the appended claims.

We claim:

1. A projector comprising a base, a lamp support carried by said base, a shield carried by said lamp support, said shield having an aperture therein to permit the passage of light from a lamp on said support within said shield, an upright wall secured on said base in front of the aperture in said shield, said wall having an aperture in alignment with the aperture in said shield, means carried by said wall for supporting a condensing lens between said apertures, a condensing lens carried by said means, a lamp housing comprising side, top and rear walls, guide means at the front of the side and top walls of said housing for slidably engaging said upright wall, means for releasably latching said housing to said base when said side and rear walls rest on said base, a slide support secured on said base in front of said vertical wall, means on said slide support for holding a transparency in alignment with said apertures and an objective lens slidably mounted in said slide support for forming an image of said transparency.

2. A projection apparatus comprising a base, a lamp support carried by said base, a lamp carried by said support, a shield carried by said base and surrounding said lamp, said shield having an aperture therethrough, a vertical wall secured on said base in front of said aperture, said wall having an opening therethrough in alignment with said aperture, means for supporting a light condenser between said aperture and said opening, a lamp housing comprising top, side and back walls, said housing having an inwardly facing groove extending around the front end of the side and top walls for slidably receiving said vertical wall, cooperative latch means on said lamp housing and said base for releasably securing said lamp housing to said base with the bottom of the side and back walls in contact with said base, means carried by said base for supporting a transparency in alignment with said opening and an objective adjustably carried by said base for forming an image of said transparency.

3. A projection apparatus comprising a base, a lamp support carried by said base, a lamp carried by said support, a shield carried by said base and surrounding said lamp, said shield having an aperture therethrough, a vertical wall secured on said base in front of said aperture, said wall having an opening therethrough in alignment with said aperture, means for supporting a light condenser between said aperture and said opening, a lamp housing comprising top, side and back walls, said housing having an inwardly facing groove extending around the front end of the side and top walls for slidably receiving said vertical wall, cooperative latch means on said lamp housing and said base for releasably securing said lamp housing to said base with the bottom of the side and back walls in contact with said base, a hollow support secured on said base in front of said vertical wall, said hollow support being open at its rear end adjacent said vertical wall and in alignment with said opening, an aperture plate mounted on said hollow support over said open end and in spaced relation to said hollow support to permit the passage of slides therebetween, said aperture plate having an aperture therethrough in alignment with the opening in said vertical wall, resilient shoes in said hollow support for pressing a slide against said aperture plate at said aperture, and an objective lens adjustably mounted in said hollow support in alignment with said aperture plate for forming an image of a slide pressed against said plate by said shoes.

4. A projector comprising a base, an upright plate fixed on said base, said plate having an aperture therethrough, a light source carried by said base on one side of said plate and in substantial alignment with said aperture, a lamp housing having side, top and bottom walls, means on said side walls for slidably engaging said plate, cooperating latch means on said base and said housing for latching said housing to said base with the side and rear walls thereof in contact with said base, a hollow support mounted on said base on the other side of said plate, means on said support for positioning a transparency in alignment with said aperture and an objective lens slidably mounted on said support in alignment with said transparency for forming an image of said transparency.

HENRY F. KURTZ.
BERNARD J. WOLFE.